US007402751B2

(12) United States Patent
Haberman

(10) Patent No.: US 7,402,751 B2
(45) Date of Patent: Jul. 22, 2008

(54) ELECTRICAL BIFURCATED SPLICE

(75) Inventor: Thomas William Haberman, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 397 days.

(21) Appl. No.: 11/243,273

(22) Filed: Oct. 3, 2005

(65) Prior Publication Data

US 2007/0111615 A1 May 17, 2007

(51) Int. Cl.
*H02G 15/02* (2006.01)

(52) U.S. Cl. .................................. 174/84 R; 174/84 C

(58) Field of Classification Search ............... 174/74 R, 174/78, 84 R, 84 C See application file for complete search history.

(56) References Cited

U.S. PATENT DOCUMENTS

| | | | | |
|---|---|---|---|---|
| 3,962,901 | A * | 6/1976 | Anderson et al. | 72/325 |
| 4,472,596 | A * | 9/1984 | Brown et al. | 174/84 C |
| 5,239,749 | A * | 8/1993 | Fujimaki et al. | 29/877 |
| 5,316,506 | A * | 5/1994 | Ito | 439/879 |
| 5,486,653 | A * | 1/1996 | Dohi | 174/84 C |
| 5,532,433 | A * | 7/1996 | Endo et al. | 174/84 C |

* cited by examiner

*Primary Examiner*—William H Mayo, III
(74) *Attorney, Agent, or Firm*—John H. Holcombe

(57) ABSTRACT

An electrical bifurcated splice and splice terminal. An electrical bifurcated splice terminal has two wireways configured such that a continuous wire may be placed in both wireways; a post separating the two wireways and configured such that the continuous wire may be positioned around the post; and two crimps, each at one of the two wireways, and configured to crimp a wire in the wireway. A continuous wire is located in the two wireways and around the post, and crimped by the two crimps.

2 Claims, 2 Drawing Sheets

ELECTRICAL BIFURCATED SPLICE

FIELD OF THE INVENTION

This invention relates to electrical connections, and, more particularly, to electrical splice connections.

BACKGROUND OF THE INVENTION

Electrical connections sometimes involve a bifurcation of a continuous wire to make a splice connection to, or junction with, that wire. Typically, the splice or junction is made by splitting (bifurcating) the wire, for a total of three wires, the two wires from the split and a third wire to which the connection is being made. A crimp of three wires is then made, sometimes with the two wires from the split at one end and the third wire at the other end of a terminal. This crimp connection does not always secure the two wires mechanically.

SUMMARY OF THE INVENTION

An electrical bifurcated splice and splice terminal, and a method for providing the splice are provided. In one embodiment of the present invention, an electrical bifurcated splice terminal comprises two wireways configured such that a continuous wire may be placed in both wireways; a post separating the two wireways and configured such that the continuous wire may be positioned around the post; and two crimps, each at one of the two wireways, and configured to crimp a wire in the wireway.

In a further embodiment, an electrical bifurcated splice comprises a continuous wire located in the two wireways and around the post, and crimped by the two crimps.

In another embodiment, the two wireways are at an interior angle of less than 180 degrees.

In still another embodiment, the post is located toward an apex of the interior angle.

In a further embodiment, the interior angle of the two wireways is substantially zero, such that the two wireways are generally parallel to each other.

In another embodiment, at least one additional wireway and crimp are separate from the two wireways, the post and the two crimps.

An embodiment of a method for providing an electrical bifurcated splice comprises the steps of: placing a continuous wire in two adjacent wireways and around a post separating the two adjacent wireways of an electrical bifurcated splice terminal; and crimping the continuous wire in each of the two wireways.

A further embodiment of a method comprises the steps of: placing another wire in an additional wireway of the electrical bifurcated splice terminal; and crimping that wire in the additional wireway, thereby forming an electrical connection between the continuous wire and that wire.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
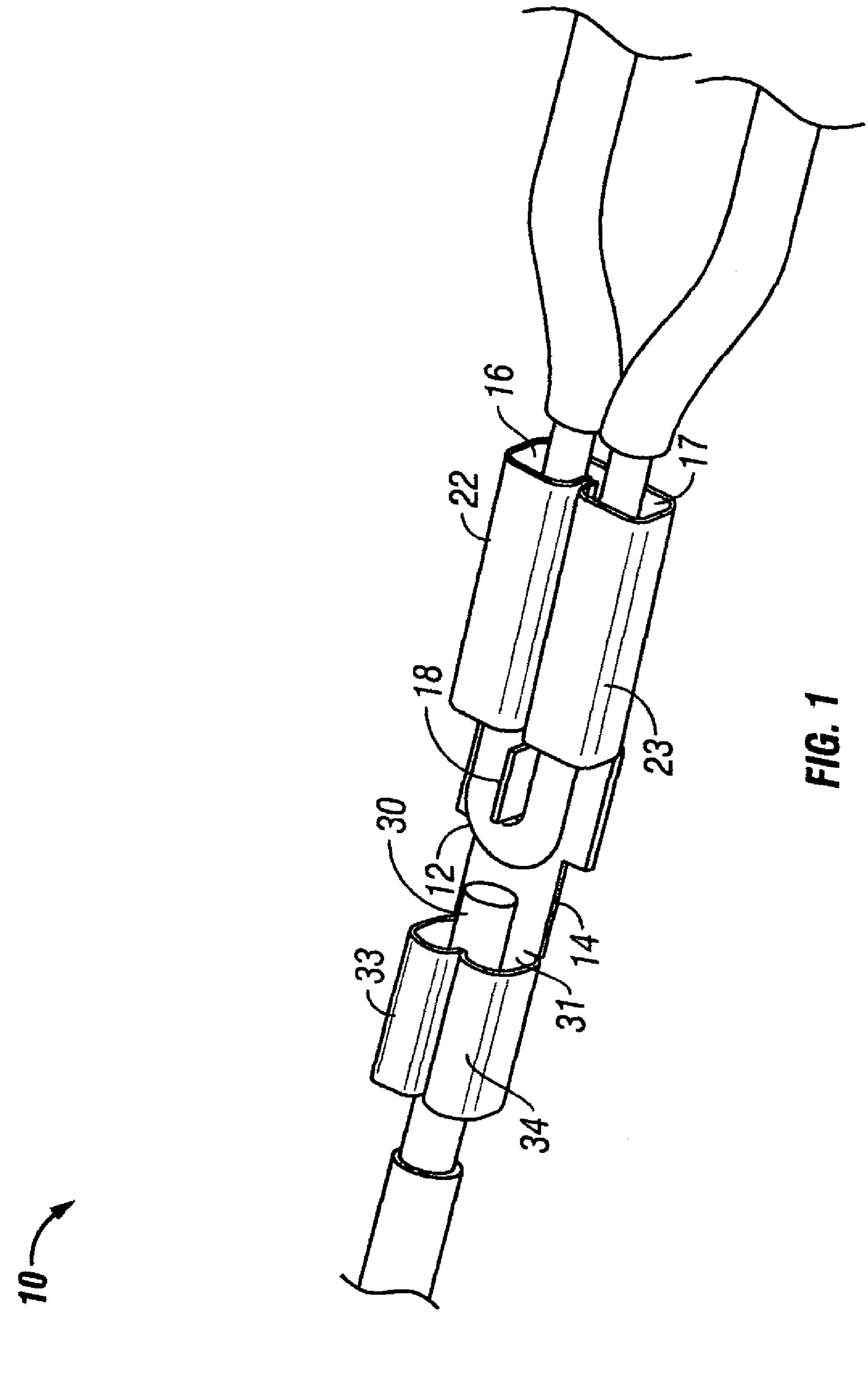
FIG. 1 is an illustration of an embodiment of an electrical bifurcated splice in accordance with the present invention.
Figure 2:
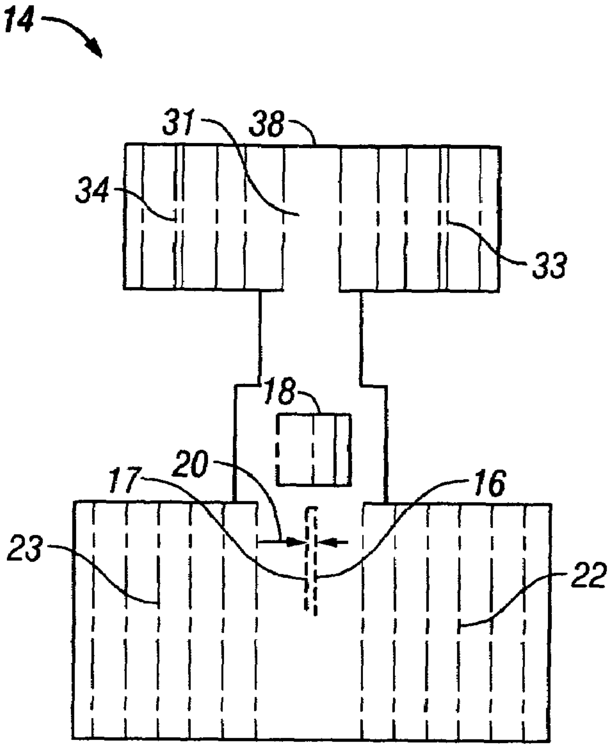
FIG. 2 is a plan view of an electrical bifurcated splice terminal of FIG. 1 prior to completion as a splice.

FIGS. 1 and 2 respectively illustrate an electrical bifurcated splice 10 and an electrical bifurcated splice terminal 14 in accordance with an embodiment of the present invention. The electrical bifurcated splice 10 makes a splice connection to, or junction with, a continuous wire 12, in the electrical bifurcated splice terminal 14.

The electrical bifurcated splice terminal 14 has two wireways 16, 17 separated by a post 18. The post 18 and the two wireways 16, 17 are configured such that the continuous wire may be positioned around the post and in the two wireways. The two wireways 16, 17 are at an interior angle of less than 180 degrees, and, in the illustrated embodiment, the interior angle 20 of the two wireways 16, 17 is substantially zero, such that the two wireways 16, 17 are generally parallel to each other. The post is located toward an apex of the interior angle such that the wire 12 may be wrapped around the post 18 and be located in the two wireways 16, 17.

Two crimps 22, 23 are provided at each of the two wireways 16, 17, and each is configured to crimp a wire in the wireway.

Thus, the continuous wire 12, after any insulation has been stripped, is located in the two wireways 16, 17 and around the post 18, and crimped by the two crimps 22, 23 to lock the continuous wire 12 in position to make a splice connection, or junction, in the electrical bifurcated splice terminal 14.

The connection may be made to another wire 30 located in an additional wireway 31, separate from the two wireways 16, 17, the post 18 and the two crimps 22, 23. The wire 30 is crimped in position in the additional wireway by an additional crimp 33, 34. Alternatively, the terminal 14 may comprise a two ended bifurcated splice terminal, comprising a second end having a second set of two wireways 16, 17, post 18, and two crimps 22, 23 to lock another continuous wire 12 in position. Still alternatively, the end 38 of terminal 14 may be directly connected, or form a direct connection, to circuitry to which the wire 12 is to be connected.

Figure 3:
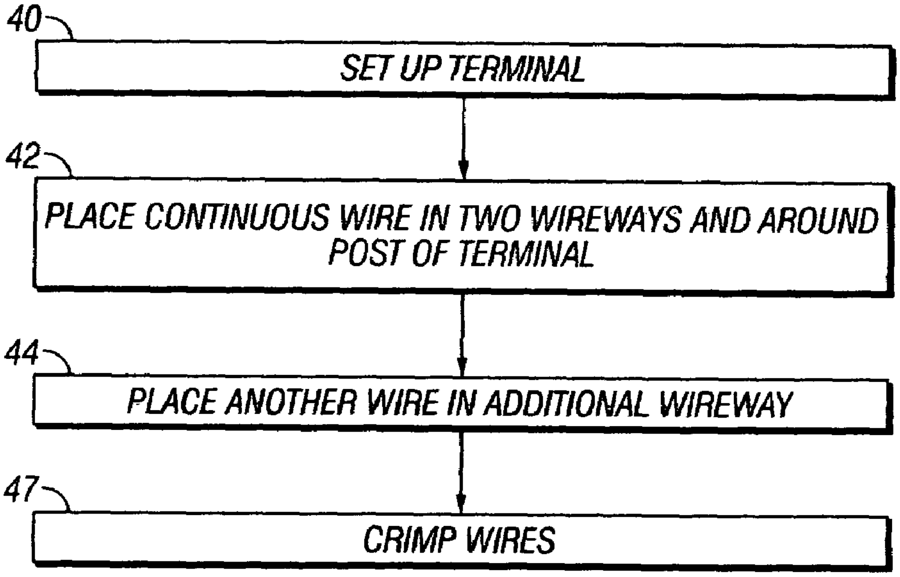
FIG. 3 is a flow chart depicting a method of providing an electrical bifurcated splice in accordance with an embodiment of the present invention.

FIG. 3 depicts a method of providing an electrical bifurcated splice in accordance with an embodiment of the present invention.

Referring to FIGS. 1, 2 and 3, in step 40, the terminal 14 is set up by positioning the terminal to receive the wire 12, and raising the post 18, for example, if it had initially been part of a flat stamping. In step 42, the continuous wire 12 (after having been stripped of any insulation for a desired length) is formed, if necessary, and placed in the two adjacent wireways 16, 17, and around the post 18 separating the two adjacent wireways. In step 44, if another wire 30 is to be connected to the wire 12, the wire 30 is placed in the additional wireway 31 of the electrical bifurcated splice terminal 14. In step 47, the continuous wire 12 in each of the two separated wireways 16, 17, is crimped in crimps 22, 23 to lock the continuous wire 12 in position. Additionally, if present, the wire 30, located in wireway 31, is crimped in crimp 33, 34, thereby forming an electrical connection between the continuous wire 12 and the wire 30.

Those of skill in the art will understand that changes may be made with respect to steps of the method of FIG. 3, and that the ordering of the steps may be changed. For example, the crimping of step 47 may be conducted separately for the wires 12 and 30, such that wire 12 may be crimped and locked in position before wire 30 is positioned in wireway 31. Further, those of skill in the art will understand that differing specific component arrangements may be employed than those illustrated herein. For example, end 38 of the terminal 14 may be at a right angle to the wireways 16, 17.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A method for providing an electrical bifurcated splice, comprising the steps of:

placing a continuous wire in two adjacent wireways, said two wireways forming an interior angle that is substantially zero, such that said two wireways are generally parallel and adjacent to each other, and around a post separating said two adjacent wireways of an electrical bifurcated splice terminal, said post located toward an apex of said interior angle of said two wireways, said continuous wire positioned from one of said two wireways, around said post, and in the opposite direction to the other of said two wireways; and crimping said continuous wire in each of said two wireways.

2. The method of claim 1, additionally comprising the steps of:

placing another wire in an additional wireway of said electrical bifurcated splice terminal; and crimping said another wire in said additional wireway, thereby forming an electrical connection between said continuous wire and said another wire.

* * * * *